US012524694B2

(12) United States Patent
Griffin et al.

(10) Patent No.: US 12,524,694 B2
(45) Date of Patent: Jan. 13, 2026

(54) OPTIMIZING ROUTE MODIFICATION USING QUANTUM GENERATED ROUTE REPOSITORY

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 1057 days.

(21) Appl. No.: 17/559,001

(22) Filed: Dec. 22, 2021

(65) Prior Publication Data

US 2023/0196162 A1 Jun. 22, 2023

(51) Int. Cl.
*G06N 10/40* (2022.01)
*G06N 10/20* (2022.01)
*G06N 10/60* (2022.01)
*G06N 10/80* (2022.01)

(52) U.S. Cl.
CPC ............ *G06N 10/40* (2022.01); *G06N 10/20* (2022.01); *G06N 10/60* (2022.01); *G06N 10/80* (2022.01)

(58) Field of Classification Search
CPC ........ G06N 10/40; G06N 10/80; G06N 10/20; G06N 10/60
USPC ......................................................... 706/62
See application file for complete search history.

(56) References Cited

U.S. PATENT DOCUMENTS 9,207,672 B2 12/2015 Williams et al.
11,112,806 B2 9/2021 Miki et al.
12,140,967 B2* 11/2024 Li ........................ G05D 1/224
2020/0097022 A1* 3/2020 Miki .................. G05D 1/0217
2020/0349509 A1* 11/2020 Sharma .................. G06N 5/01
(Continued)

FOREIGN PATENT DOCUMENTS

CN       106197455 B    11/2018
CN       108597246 B    10/2020
JP       2020056730 A    4/2020

OTHER PUBLICATIONS

Author Unknown, "Volkswagen: Optimizing Traffic Flow with Quantum Computers," Volkswagen, Oct. 29, 2019, https://www.quantaneo.com/Volkswagen-optimizing-traffic-flow-with-quantum-computers_a309.html, 3 pages.
(Continued)

*Primary Examiner* — Austin Hicks
(74) *Attorney, Agent, or Firm* — Dority & Manning, P.A.

(57) ABSTRACT

Optimizing route modification using a quantum generated route repository is provided herein. In particular, a classical computing system determines an initial route optimization request comprising at least one initial constraint. The at least one initial constraint includes a starting location and an ending location for a desired route. The classical computing system determines a plurality of initial optimized routes from a plurality of routes based on the at least one initial constraint. The plurality of routes are generated by a quantum computing system. The classical computing system determines a modified route optimization request. The modified route optimization request includes at least one modified constraint. The classical computing system determines a plurality of modified optimized routes from the plurality of routes based on the at least one modified constraint. The plurality of routes are previously generated by the quantum computing system.

18 Claims, 6 Drawing Sheets

(56) References Cited

U.S. PATENT DOCUMENTS

2023/0177415 A1* 6/2023 Kumar .................. G06N 10/60

OTHER PUBLICATIONS

Bowman, R., "Watch: Using Quantum Computing to Optimize Shipping Routes," SupplyChainBrain, Mar. 14, 2021, https://www.supplychainbrain.com/articles/32771-watch-using-quantum-computing-to-optimize-shipping-routes, 2 pages.
Savoie, C., "How Quantum Computers Could Cut Millions of Miles from Supply Chains and Transform Logistics," Forbes Technology Council, Feb. 5, 2021, https://www.forbes.com/sites/forbestechcouncil/2021/02/05/how-quantum-computers-could-cut-millions-of-miles-from-supply-chains-and-transform-logistics/?sh=5ea1c4b325a9, 5 pages.

* cited by examiner

OPTIMIZING ROUTE MODIFICATION USING QUANTUM GENERATED ROUTE REPOSITORY

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

SUMMARY

The examples disclosed herein provide for optimizing route modification using a quantum generated route repository. In particular, a classical computing system determines an initial route optimization request comprising at least one initial constraint. The at least one initial constraint includes a starting location and an ending location for a desired route. The classical computing system determines a plurality of initial optimized routes from a plurality of routes based on the at least one initial constraint. The plurality of routes are generated by a quantum computing system. The classical computing system determines a modified route optimization request. The modified route optimization request includes at least one modified constraint. The classical computing system determines a plurality of modified optimized routes from the plurality of routes based on the at least one modified constraint. The plurality of routes are previously generated by the quantum computing system.

In one example, a method is provided. The method includes determining, by a classical computing system comprising one or more processor devices, an initial route optimization request comprising at least one initial constraint. The at least one initial constraint comprises a starting location and an ending location for a desired route. The method further includes determining, by the classical computing system, a plurality of initial optimized routes from a plurality of routes based on the at least one initial constraint. The plurality of routes are generated by a quantum computing system. The method further includes determining, by the classical computing system, a modified route optimization request. The modified route optimization request includes at least one modified constraint. The method further includes determining, by the classical computing system, a plurality of modified optimized routes from the plurality of routes based on the at least one modified constraint. The plurality of routes are previously generated by the quantum computing system.

In another implementation, a classical computing system is disclosed. The classical computing system includes a processor device to determine an initial route optimization request comprising at least one initial constraint, the at least one initial constraint comprising a starting location and an ending location for a desired route. The processor device is further to determine a plurality of initial optimized routes from a plurality of routes based on the at least one initial constraint. The plurality of routes are generated by a quantum computing system. The processor device is further to determine a modified route optimization request, the modified route optimization request comprising at least one modified constraint. The processor device is further to determine a plurality of modified optimized routes from the plurality of routes based on the at least one modified constraint. The plurality of routes are previously generated by the quantum computing system.

In still another implementation, a computer program product is disclosed. The computer program product is stored on a non-transitory computer-readable storage medium and includes instructions to cause a processor device of a classical computing system to determine an initial route optimization request comprising at least one initial constraint. The at least one initial constraint includes a starting location and an ending location for a desired route. The instructions further cause a processor device to determine a plurality of initial optimized routes from a plurality of routes based on the at least one initial constraint. The plurality of routes are generated by a quantum computing system. The instructions further cause a processor device to determine a modified route optimization request, the modified route optimization request comprising at least one modified constraint. The instructions further cause a processor device to determine a plurality of modified optimized routes from the plurality of routes based on the at least one modified constraint. The plurality of routes are previously generated by the quantum computing system.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

Quantum computing is probabilistic in nature, compared to classical computing which is deterministic. As a result, quantum computing devices return multiple values, providing the optimal solution along with other alternative solutions as well.

In this regard, the examples herein disclose a classical optimizer service to optimize route modification using a quantum generated route repository. Quantum computing devices calculate every permutation and combination of routes. Classical computing devices then leverage these calculated routes to optimize and modify route execution.

Figure 1A:
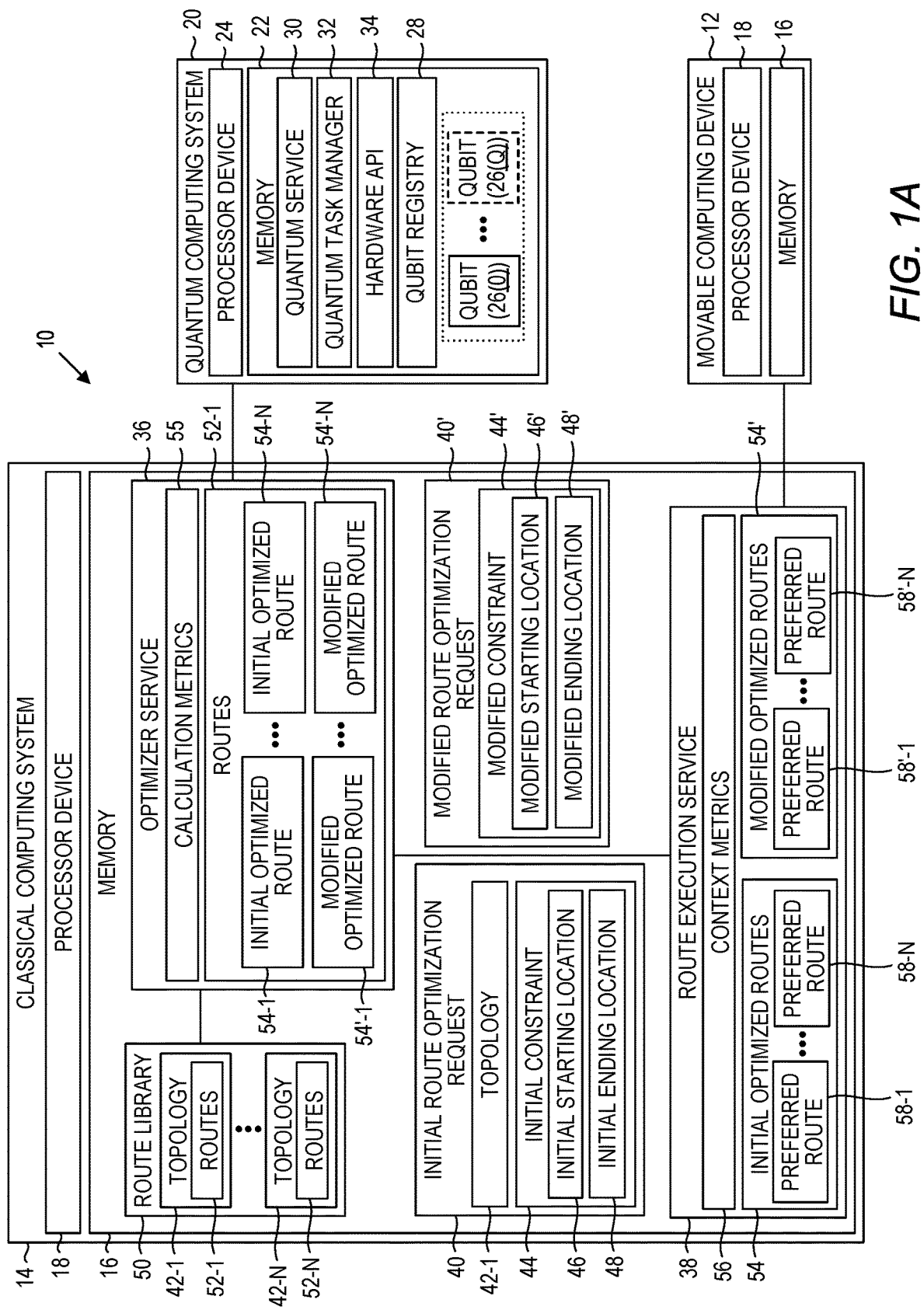
FIG. 1A is a block diagram of a system to optimize route modification using a quantum generated route repository according to one example.

FIG. 1A is a block diagram of a computing system 10 according to one example. The computing system 10 includes a movable computing device 12 and a classical computing system 14, which are classical computing devices including a memory 16 and a processor device 18. In certain implementations, the classical computing system 14 includes functionality provided by the movable computing device 12. The computing system 10 includes a quantum computing system 20 including a system memory 22 and a processor device 24. The movable computing device 12, the classical computing system 14, and/or the quantum computing system 20 are all communicatively coupled via a classical communications link (not shown), which may include a private network or a public network such as the internet. It is to be understood that the computing system 10, according to some examples, may include other quantum computing devices and/or classical computing devices that are not illustrated in FIG. 1A. Additionally, the movable computing device 12, the classical computing system 14, and/or the quantum computing system 20 in some examples may include constituent elements in addition to those illustrated.

In the example of FIG. 1A, the quantum computing system implements a set of one or more qubits 26(0)-26(Q) (referred to generally as qubits 26) for use by quantum services executed by the quantum computing system 20. To maintain information for the qubit(s) 26, the quantum computing system 20 may include a qubit registry 28, which includes a plurality of qubit registry entries, each corresponding to a qubit such as the one or more qubits 26. The qubit registry 28 maintains and provides access to data relating to the qubits implemented by the quantum computing system 20, such as a count of the total number of qubits implemented by the quantum computing system 20 and a count of the number of available qubits that are currently available for allocation, as non-limiting examples. Each of the qubit registry entries of the qubit registry 28 also stores qubit metadata for a corresponding qubit 26. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing system 20 executes one or more quantum services 30. A quantum service 30 is a process that executes on a quantum computing system 20 and employs qubits 26 to provide desired functionality. The quantum service 30 is defined using a quantum service definition, such as provided by a quantum assembly (QASM) file, which includes one or more quantum programming instructions. QASM is a programming language that specifies quantum circuits as input to a quantum computer by declaring classical bits and qubits and describing operations on the qubits and measurements needed to obtain a classical result based on the qubits.

Execution of quantum services 30 is facilitated by a quantum task manager 32, which handles operations for creating, monitoring, and terminating quantum services 30. The quantum task manager 32 may provide an interface (not shown) through which other services or tasks may request specific information regarding the qubits 26, the quantum services 30, and/or the quantum computing system 20. Additionally, information regarding the status and functionality of the quantum computing system 20 and the elements thereof may be made accessible to other processes via a hardware application programming interface (API) 34.

The classical computing system 14 is in communication with the quantum computing system 20. For example, in certain implementations, the classical computing system 14 is in communication with the movable computing device 12. The movable computing device 12 may be associated or correspond with a vehicle. Accordingly, the classical computing system 14 facilitates routing communications between the movable computing device 12 and/or the quantum computing system 20.

In certain implementations, the classical computing system 14 includes an optimizer service 36 in communication with the quantum computing system 20. The optimizer service 36 is configured to determine optimized routes. In certain implementations, the classical computing system 14 includes a route execution service 38 in communication with the movable computing device 12. In certain implementations, the route execution service 38 may be a third-party service separate from the optimizer service 36. The route execution service 38 monitors and communicates with the movable computing device 12 to evaluate execution of a route by the movable computing device 12.

In certain implementations, the route execution service 38 and/or the movable computing device 12 generates an initial route optimization request 40. The initial route optimization request 40 may include or identify a topology 42-1 and an initial constraint 44. In certain implementations, the initial route optimization request 40 is a QASM file. The topology 42 may provide information of a geographic area, such as identifying roads, elevation changes, stop signs, traffic lights, or the like. In certain implementations, the initial route optimization request 40 merely identifies a general location, such as by GPS (global positioning satellite) and the topology 42 is pulled from a third-party service or from a database. The initial route optimization request 40 may also request the most optimized route and a determined number of alternative optimized routes, where the determined number is configurable.

The initial constraint 44 may include an initial starting location 46 and/or an initial ending location 48. The initial constraint 44 may include other constraints, such as intermediate locations and/or detour locations along a desired route. For example, the initial constraint 44 may include the starting location 46 and one or more intermediate locations that must be visited along the route from the starting location 46 to the ending location 48. As another example, the initial constraint 44 may include the initial starting location 46 and one or more detour locations that must be avoided along the route from the starting location 46 to the ending location 48. Detour locations may be required for accidents, traffic delays, or the like.

The route execution service 38 sends the initial route optimization request 40 to the optimizer service 36, which forwards the initial route optimization request 40 to the quantum computing system 20. The optimizer service 36 is in communication with a route library 50. In certain implementations, the optimizer service 36 determines whether the route library 50 already has calculated routes for the requested topology 42. If the requested topology 42-1 has not been generated or is outdated, or for any other reason, the optimizer service 36 forwards the initial route optimization request 40 to the quantum computing system 20.

The quantum computing system 20 calculates routes 52-1 for the topology 42 consistent with the initial constraints 44. Due to the probabilistic nature of quantum computing, the quantum computing system 20 calculates every possible permutation and combination of routes 52-1 for the topology 42. The quantum computing system 20 calculates every possible route between every two locations for the topology 42. The plurality of routes 52-1 includes every possible route between every location within a topology 42-1 provided to the quantum computing system 20. Unless included as the initial constraint 44, the quantum computing system 20 may only be searching for shortest distance without taking into account real-time considerations, such as accidents, traffic delay, daily traffic fluctuations, monthly traffic fluctuations, or the like. The quantum computing system 20 may assume ideal conditions.

As a result, the quantum computing system 20 provides the optimizer service 36 with initial optimized routes 54-1-54-N (referred to generally as initial optimized routes 54) of the plurality of routes 52-1. The initial optimized routes 54 identify at least a most optimized route 54-1 and potentially a plurality of alternative optimized routes 54-N. In certain implementations, the optimizer service 36 may receive the routes 52-1 and identify the initial optimized routes 54 depending on calculation metrics 55. For example, the optimizer service 36 may know the initial starting location 46 and the current route of the movable computing device 12, and revise the initial optimized routes 54 to incorporate any delay in providing the routes 52-1 to the movable computing device 12.

The optimizer service 36 stores the routes 52-1 and/or topology 42 in the route library 50. In this way, over time, the route library 50 compiles a plurality of topologies 42-1-42-N (referred to generally as topology 42) and/or associated routes 52-1-52-N (referred to generally as routes 52). The optimizer service 36 forwards the initial optimized routes 54 to the route execution service 38.

The route execution service 38 includes context metrics 56, such as accidents, traffic delay, daily traffic fluctuations, monthly traffic fluctuations, or the like. The route execution service 38 takes the initial optimized routes and determines at least one preferred route 58-1-58-N (referred to generally as preferred routes 58) of the initial optimized routes 54. Accordingly, the route execution service 38 incorporates real-time information into determining which initial optimized route 54 is preferred given real-time road conditions and other real-world information.

The route execution service 38 may monitor execution of one of the preferred routes 58 by the movable computing device 12. In certain implementations, the route execution service 38 receives requests from the movable computing device 12 when deviating from the preferred route 58. The route execution service 38 may determine another preferred route 58 of the initial optimized routes 54 and forward the identified preferred route 58 to the movable computing device 12. However, if the movable computing device 12 has deviated and/or been delayed beyond a determined threshold, then the route execution service 38 sends a modified route optimization request 40' to the optimizer service 36. The modified route optimization request 40' may include a modified constraint 44' such as a modified starting location 46' and a modified ending location 48'.

Based on the modified constraints 44', the optimizer service 36 retrieves the routes 52-1 from the route library 50 and determines modified optimized routes 54'-1-54'-N (referred to generally as modified optimized routes 54'). Generally, the optimizer service 36 does not forward the modified route optimization request 40' to the quantum computing system 20 because the quantum computing system 20 has already computed every permutation and combination of every possible route of the topology 42-1. Comparatively, any modification, deviation, and/or delay from a route would require the classical computing system to calculate a new route. Instead, the optimizer service 36 simply filters the routes 52-1 to identify modified optimized routes 54' consistent with the modified constraints 44'. The optimizer service 36 may incorporate the calculation metrics 55 in identifying the modified optimized routes 54'. For example, the optimizer service 36 estimates a time to calculate the plurality of modified optimized routes 54', determines a lead starting location a lead distance ahead of a modified starting location based on the time estimated, and determines the plurality of modified optimized routes 54' from the plurality of routes 52-1 based on the lead starting location.

The optimizer service 36 forwards the modified optimized routes 54' to the route execution service 38. As similarly noted above, the route execution service 38 incorporates the context metrics 56 to identify preferred routes 58'-1-58'-N (referred to generally as preferred routes 58') of the modified optimized routes 54'. Such a configuration provides quick recalculation without needing to reexecute the request on the quantum computing system 20.

Figure 1B:
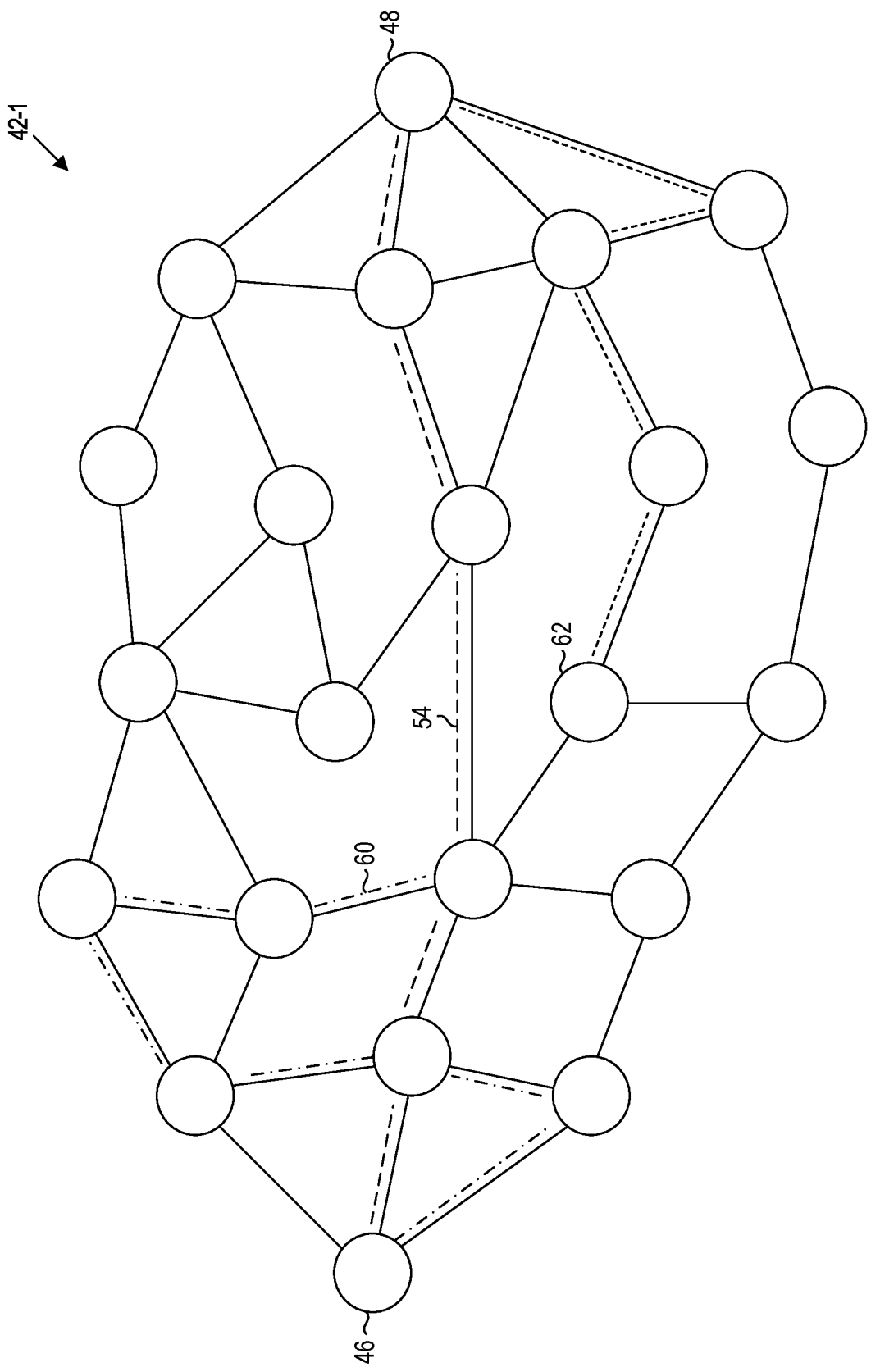
FIG. 1B is a diagram illustrating a network topology and a plurality of routes through the network topology according to one example.

FIG. 1B is a diagram illustrating the network topology 42-1 and a plurality of routes 54, 60 through the network topology 42-1 according to one example. The network topology 42-1 includes a starting location 46 and an ending location 48. As noted above, the probabilistic nature of quantum computing calculates every permutation and combination of routes. For example, the quantum computing system 20 identifies an optimized route 54 and an unoptimized route 60. The quantum computing system 20 calculates every route from every node in the topology 42-1 to every other node in the topology 42-1.

If the movable computing device 12 is at node 62, then the movable computing device 12 has deviated from the optimized route 54. However, the quantum computing system 20 has already calculated every possible route from node 62 to the ending location 48. Accordingly, the optimizer service 36 only needs to search the route library 50 for node 62.

Figure 2:
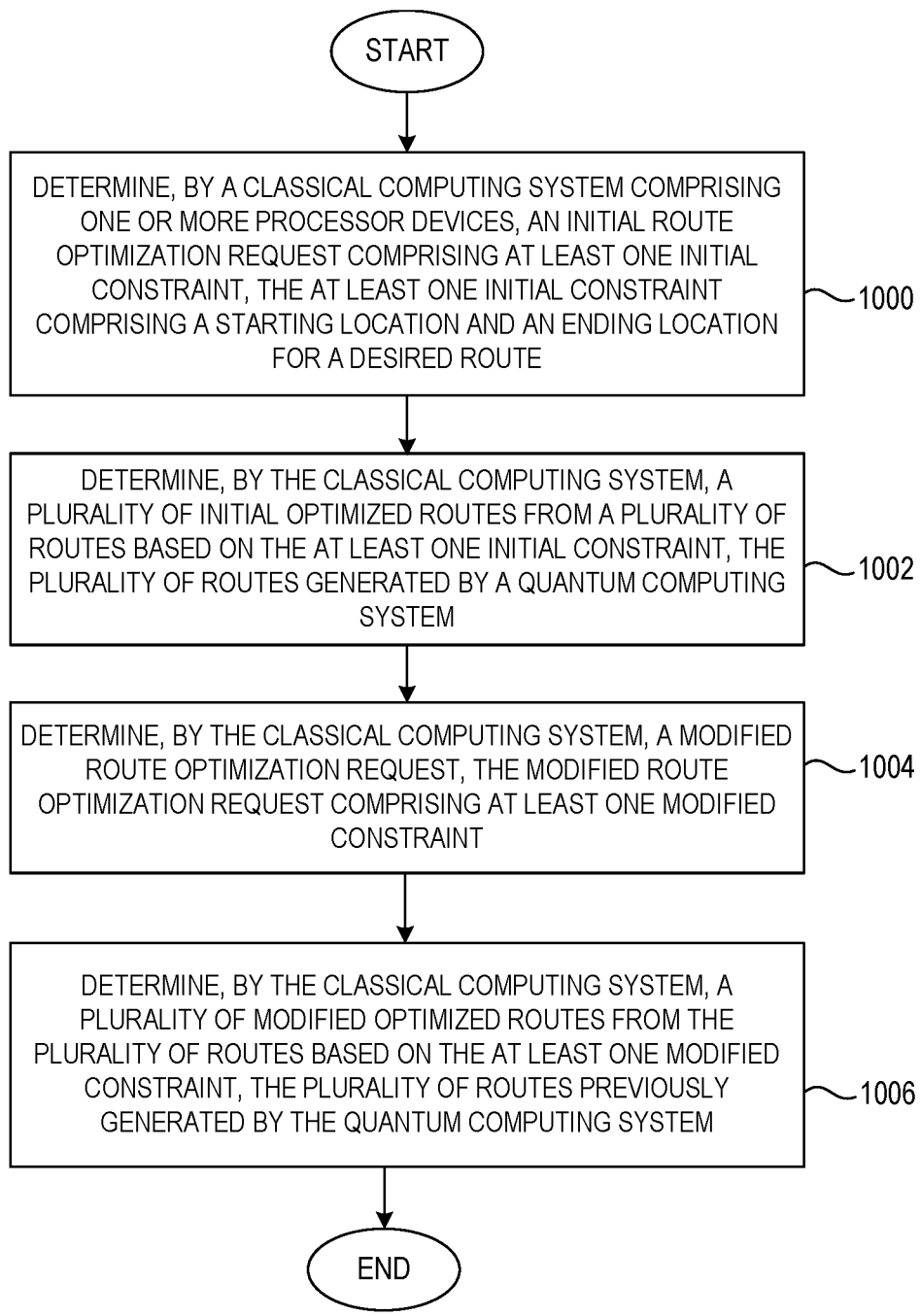
FIG. 2 is a flowchart of a method for optimizing a route according to one example.

FIG. 2 is a flowchart of a method for optimizing a route according to one example. FIG. 2 will be discussed in conjunction with FIG. 1A. A classical computing system 14 determines an initial route optimization request 40 comprising at least one initial constraint 44 (1000). The at least one initial constraint 44 includes a starting location 46 and an ending location 48 for a desired route. The classical computing system determines a plurality of initial optimized routes 54 from a plurality of routes 52-1 based on the at least one initial constraint 44 (1002). The plurality of routes 52-1 are generated by a quantum computing system 20. The classical computing system 14 determines a modified route optimization request 40' (1004). The modified route optimization request 40' includes at least one modified constraint 44'. The classical computing system 14 determines a plurality of modified optimized routes 54' from the plurality of routes 52-1 based on the at least one modified constraint 44' (1006). The plurality of routes 52-1 are previously generated by the quantum computing system 20.

Figure 3:
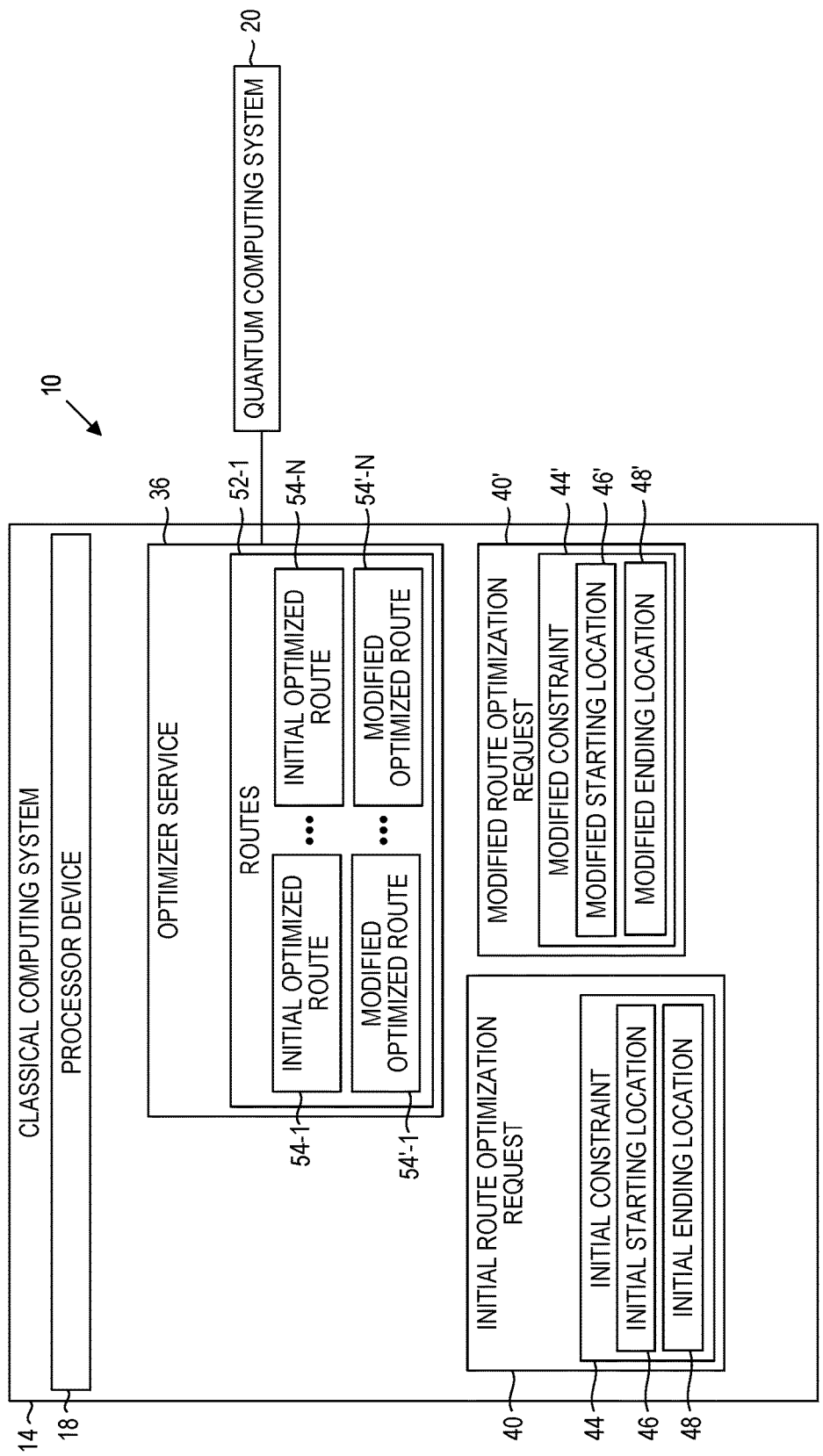
FIG. 3 is a simplified block diagram of the system illustrated in FIG. 1A according to one implementation.

FIG. 3 is a simplified block diagram of the computing system 10 illustrated in FIG. 1A according to one implementation. In this example, the system includes a classical computing system 14 with a processor device 18. The classical computing system 14 determines an initial route optimization request 40 comprising at least one initial constraint 44. The at least one initial constraint 44 includes an initial starting location 46 and an initial ending location 48 for a desired route. The classical computing system 14 determines a plurality of initial optimized routes 54 from a plurality of routes 52-1 based on the at least one initial constraint 44. The plurality of routes 52-1 are generated by a quantum computing system 20. The classical computing system 14 determines a modified route optimization request 40'. The modified route optimization request 40' includes at least one modified constraint 44'. The classical computing system 14 determines a plurality of modified optimized routes 54' from the plurality of routes 52-1 based on the at least one modified constraint 44'. The plurality of routes 52-1 are previously generated by the quantum computing system 20.

Figure 4:
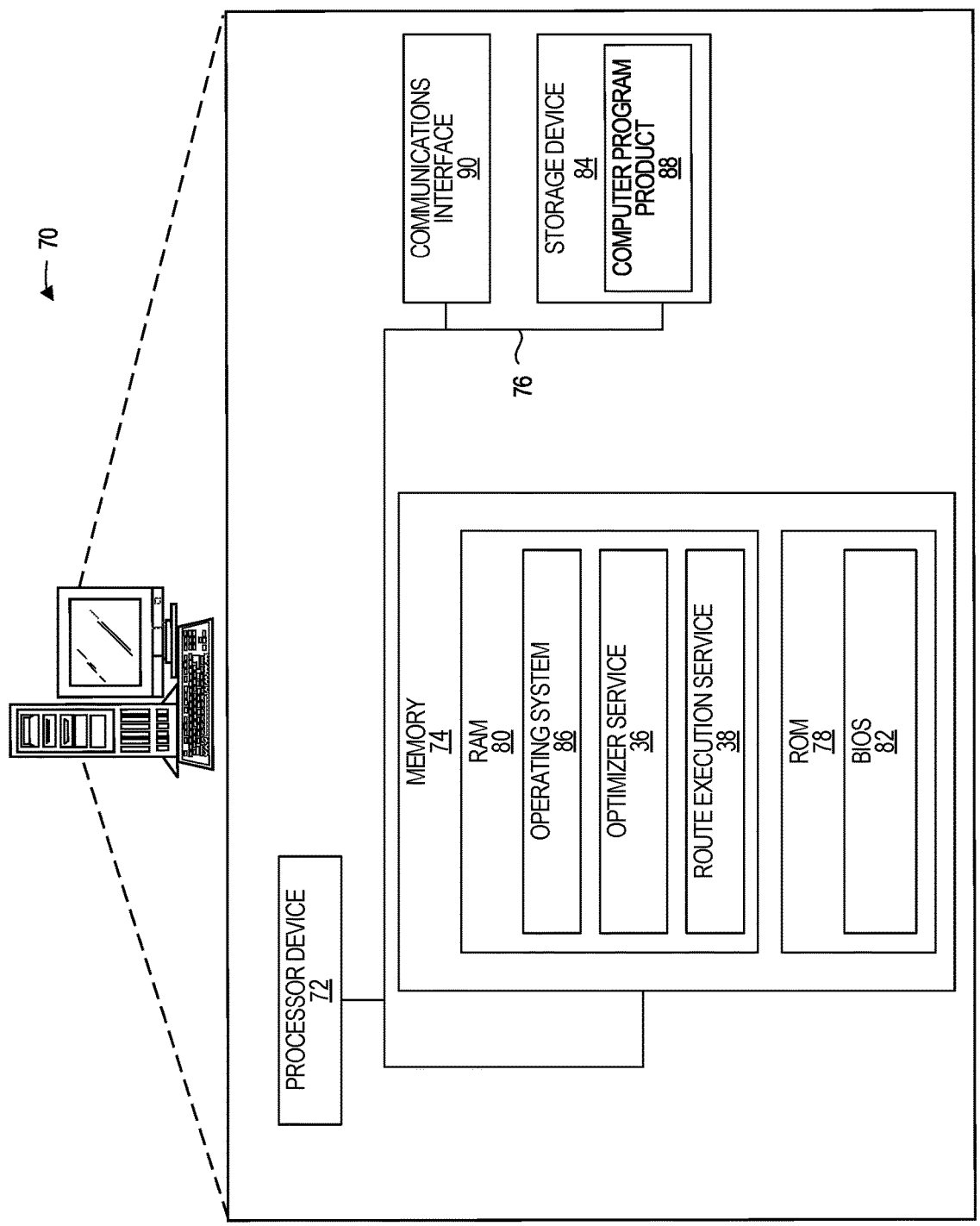
FIG. 4 is a block diagram of a computing device suitable for implementing one or more of the processing devices disclosed herein, according to one implementation.

FIG. 4 is a block diagram of a computing device 70 containing components suitable for implementing any of the processing devices disclosed herein. The computing device 70 includes a processor device 72, a system memory 74, and a system bus 76. The system bus 76 provides an interface for system components including, but not limited to, the system memory 74 and the processor device 72. The processor device 72 can be any commercially available or proprietary processor.

The system bus 76 may be any of several types of bus structures that may further interconnect to a memory bus (with or without a memory controller), a peripheral bus, and/or a local bus using any of a variety of commercially available bus architectures. The system memory 74 may include non-volatile memory 78 (e.g., read-only memory (ROM), erasable programmable read-only memory (EPROM), electrically erasable programmable read-only memory (EEPROM), or the like), and volatile memory 80 (e.g., random-access memory (RAM)). A basic input/output system (BIOS) 82 may be stored in the non-volatile memory 78 and can include the basic routines that help transfer information between elements within the computing device 70. The volatile memory 80 may also include a high-speed RAM, such as static RAM, for caching data.

The computing device 70 may further include or be coupled to a non-transitory computer-readable storage medium such as a storage device 84, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 84 and other drives associated with computer-readable media and computer-usable media may provide non-volatile storage of data, data structures, computer-executable instructions, and the like.

A number of modules can be stored in the storage device 84 and in the volatile memory 80, including an operating system 86 and one or more program modules, which may implement the functionality described herein in whole or in part. All or a portion of the examples herein may be implemented as a computer program product 88 stored on a transitory or non-transitory computer-usable or computer-readable storage medium, such as the storage device 84, which includes complex programming instructions, such as complex computer-readable program code, to cause the processor device 72 to carry out the steps described herein. Thus, the computer-readable program code can comprise software instructions for implementing the functionality of the examples described herein when executed on the processor device 72. The processor device 72, in conjunction with the network manager in the volatile memory 80, may serve as a controller or control system for the computing device 70 that is to implement the functionality described herein.

The computing device 70 may also include one or more communication interfaces 90, depending on the particular functionality of the computing device 70. The communication interfaces 90 may comprise one or more wired Ethernet transceivers, wireless transceivers, fiber, satellite, and/or coaxial interfaces by way of non-limiting examples.

Figure 5:
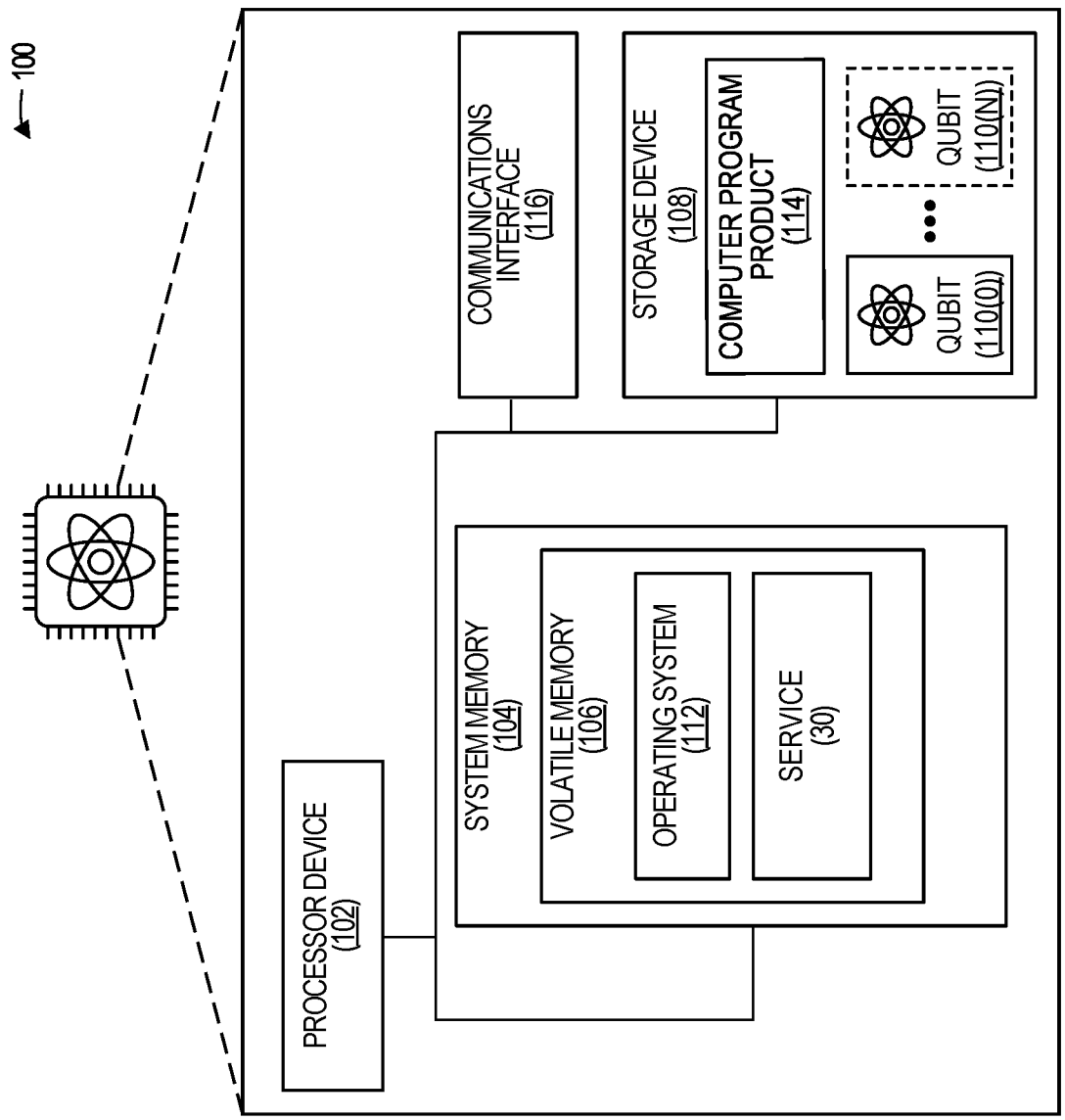
FIG. 5 is a block diagram of a quantum computing device suitable for implementing examples, according to one example.

FIG. 5 is a block diagram of a quantum computing system 100, such as the quantum computing system 20 of FIGS. 1A-1B, suitable for implementing examples according to one example. The quantum computing system 100 may comprise any suitable quantum computing device or devices. The quantum computing system 100 can operate using classical computing principles or quantum computing principles. When using quantum computing principles, the quantum computing system 100 performs computations that utilize quantum-mechanical phenomena, such as superposition and entanglement. The quantum computing system 100 may operate under certain environmental conditions, such as at or near zero degrees (0°) Kelvin. When using classical computing principles, the quantum computing system 100 utilizes binary digits that have a value of either zero (0) or one (1).

The quantum computing system 100 includes a processor device 102 and a system memory 104. The processor device 102 can be any commercially available or proprietary processor suitable for operating in a quantum environment. The system memory 104 may include volatile memory 106 (e.g., random-access memory (RAM)). The quantum computing system 100 may further include or be coupled to a non-transitory computer-readable medium such as a storage device 108. The storage device 108 and other drives associated with computer-readable media and computer-usable media may provide non-volatile storage of data, data structures, computer-executable instructions, and the like. The storage device may also provide functionality for storing one or more qubits 110(0)-110(N).

A number of modules can be stored in the storage device 108 and in the volatile memory 106, including an operating system 112 and one or more modules. All or a portion of the examples may be implemented as a computer program product 114 stored on a transitory or non-transitory computer-usable or computer-readable medium, such as the storage device 108, which includes complex programming instructions, such as complex computer-readable program code, to cause the processor device 102 to carry out the steps described herein. Thus, the computer-readable program code can comprise computer-executable instructions for implementing the functionality of the examples described herein when executed on the processor device 102.

An operator may also be able to enter one or more configuration commands through a keyboard (not illustrated), a pointing device such as a mouse (not illustrated), or a touch-sensitive surface such as a display device (not illustrated). The quantum computing system 100 may also include a communications interface 116 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   determining, by a classical computing system comprising one or more processor devices, an initial route optimization request comprising at least one initial constraint, the at least one initial constraint comprising a starting location and an ending location for a desired route;
   determining, by the classical computing system, a plurality of initial optimized routes from a plurality of routes based on the at least one initial constraint, the plurality of routes received from a quantum computing system, wherein the plurality of routes comprises at least one route between every node in a network topology to every other node in the network topology, the network topology comprising information related to a geographic area;
   determining, by the classical computing system, a modified route optimization request, the modified route optimization request comprising at least one modified constraint, the at least one modified constraint comprising at least one modified location, the at least one modified location comprising one or more of a modified starting location or a modified ending location; and
   determining, by the classical computing system, a plurality of modified optimized routes from the plurality of routes based on the at least one modified constraint, the plurality of routes previously generated by the quantum computing system.

2. The method of claim 1, further comprising:
   sending, by the classical computing system, the initial route optimization request to the quantum computing system; and
   receiving, by the classical computing system from the quantum computing system, the plurality of routes, a portion of the plurality of routes comprising the plurality of initial optimized routes based on the at least one initial constraint.

3. The method of claim 1, wherein determining, by the classical computing system, the initial route optimization request comprising the at least one initial constraint further comprises:
   determining, by the classical computing system, the initial route optimization request comprising a topology and the at least one initial constraint.

4. The method of claim 1, wherein determining, by the classical computing system, the plurality of initial optimized routes from the plurality of routes based on the at least one initial constraint, the plurality of routes generated by the quantum computing system further comprises:
   determining, by the classical computing system, the plurality of initial optimized routes from the plurality of routes based on the at least one initial constraint, the plurality of routes generated by the quantum computing system, the plurality of initial optimized routes optimized for shortest distance.

5. The method of claim 1, wherein the classical computing system does not send the modified route optimization request to the quantum computing system.

6. The method of claim 1, wherein determining, by the classical computing system, the modified route optimization request, the modified route optimization request comprising the at least one modified constraint further comprises:
   determining, by the classical computing system, the modified route optimization request, the modified route optimization request comprising the at least one modified constraint, the at least one modified constraint comprising the at least one modified location, the at least one modified location further comprising an intermediate location for a desired route.

7. The method of claim 1, wherein determining, by the classical computing system, the modified route optimization request, the modified route optimization request comprising the at least one modified constraint further comprises:
   determining, by the classical computing system, the modified route optimization request, the modified route optimization request comprising the at least one modified constraint, the at least one modified constraint comprising the at least one modified location, the at least one modified location further comprising a detour location to avoid for a desired route.

8. The method of claim 1, wherein the at least one modified location comprises the modified starting location, and wherein determining, by the classical computing system, the modified route optimization request, the modified route optimization request comprising the at least one modified constraint further comprises:
   calculating a difference between the modified starting location and the plurality of initial optimized routes.

9. The method of claim 1, wherein the at least one modified location comprises the modified starting location, and wherein determining, by the classical computing system, the modified route optimization request, the modified route optimization request comprising the at least one modified constraint further comprises:
   estimating a time to calculate the plurality of modified optimized routes;
   determining a lead starting location a lead distance ahead of the modified starting location based on the time estimated; and
   determining the plurality of modified optimized routes from the plurality of routes based on the lead starting location.

10. The method of claim 1, wherein determining, by the classical computing system, the initial route optimization request comprising the at least one initial constraint, the at least one initial constraint comprising the starting location and the ending location for the desired route further comprises:
    receiving, by the classical computing system, the initial route optimization request from a classical route execution service;
    further comprising sending, by the classical computing system, the plurality of initial optimized routes;
    wherein determining, by the classical computing system, the modified route optimization request, the modified route optimization request comprising the at least one modified constraint further comprises:
receiving, by the classical computing system, the initial route optimization request from the classical route execution service; and
further comprising sending, by the classical computing system to the classical route execution service, the plurality of modified optimized routes.

11. The method of claim 1, further comprising determining, by the classical computing system, a first preferred route from the plurality of initial optimized routes by integrating real-time context metrics.

12. The method of claim 1, further comprising monitoring, by the classical computing system, route execution by a movable computing device.

13. The method of claim 12, further comprising:
determining, by the classical computing system, a deviation in route execution of the movable computing device from a first preferred route of the plurality of initial optimized routes;
determining, by the classical computing system, a second preferred route from the plurality of initial optimized routes by integrating real-time context metrics; and
sending, by the classical computing system, the second preferred route of the plurality of initial optimized routes to the movable computing device.

14. The method of claim 12, further comprising:
determining, by the classical computing system, a delay in route execution of the movable computing device of a first optimized route of the plurality of initial optimized routes; and
sending, by the classical computing system, a second optimized route of the plurality of initial optimized routes to the movable computing device.

15. A classical computing system comprising:
a processor device to:
determine an initial route optimization request comprising at least one initial constraint, the at least one initial constraint comprising a starting location and an ending location for a desired route;
determine a plurality of initial optimized routes from a plurality of routes based on the at least one initial constraint, the plurality of routes received from a quantum computing system, wherein the plurality of routes comprises at least one route between every node in a network topology to every other node in the network topology, the network topology comprising information related to a geographic area;
determine a modified route optimization request, the modified route optimization request comprising at least one modified constraint, the at least one modified constraint comprising at least one modified location, the at least one modified location comprising one or more of a modified starting location or a modified ending location; and
determine a plurality of modified optimized routes from the plurality of routes based on the at least one modified constraint, the plurality of routes previously generated by the quantum computing system.

16. A computer program product stored on a non-transitory computer- readable storage medium and including instructions to cause a processor device of a classical computing system to:
determine an initial route optimization request comprising at least one initial constraint, the at least one initial constraint comprising a starting location and an ending location for a desired route;
determine a plurality of initial optimized routes from a plurality of routes based on the at least one initial constraint, the plurality of routes received from a quantum computing system, wherein the plurality of routes comprises at least one route between every node in a network topology to every other node in the network topology, the network topology comprising information related to a geographic area;
determine a modified route optimization request, the modified route optimization request comprising at least one modified constraint, the at least one modified constraint comprising at least one modified location, the at least one modified location comprising one or more of a modified starting location or a modified ending location; and
determine a plurality of modified optimized routes from the plurality of routes based on the at least one modified constraint, the plurality of routes previously generated by the quantum computing system.

17. The classical computing system of claim 15, wherein the processor device is further to:
monitor route execution of a movable computing device;
determine a deviation in the route execution of the movable computing device from a first preferred route of the plurality of initial optimized routes;
determine a second preferred route of the plurality of initial optimized routes by integrating real-time context metrics; and
send the second preferred route of the plurality of initial optimized routes to the movable computing device.

18. The computer program product of claim 16, wherein the instructions are further to cause the processor device of the classical computing system to:
monitor route execution of a movable computing device;
determine a deviation in the route execution of the movable computing device from a first preferred route of the plurality of initial optimized routes;
determine a second preferred route of the plurality of initial optimized routes by integrating real-time context metrics; and
send the second preferred route of the plurality of initial optimized routes to the movable computing device.

* * * * *